(12) United States Patent
Schulz et al.

(10) Patent No.: US 6,645,451 B1
(45) Date of Patent: *Nov. 11, 2003

(54) METHOD OF PREPARING INORGANIC PENTAFLUORIDES

(75) Inventors: Alf Schulz, Wedemark (DE); Dirk Seffer, Neustadt (DE); Matthias Rieland, Hannover (DE); Werner Rudolph, Hannover (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 270 days.

This patent is subject to a terminal disclaimer.

(21) Appl. No.: 08/876,529

(22) Filed: Jun. 16, 1997

(30) Foreign Application Priority Data

| Jun. 26, 1996 | (DE) | 196 25 528 |
| Mar. 27, 1997 | (DE) | 197 12 990 |
| May 28, 1997 | (DE) | 197 22 269 |

(51) Int. Cl.[7] .......................... C01B 25/10; C01G 28/00
(52) U.S. Cl. ...................... 423/301; 423/489
(58) Field of Search ................ 423/300, 489, 423/301

(56) References Cited

U.S. PATENT DOCUMENTS

| 2,810,629 A | * 10/1957 | Muetterties | 423/301 |
| 2,933,375 A | * 4/1960 | Brinker | 423/301 |
| 3,584,999 A | * 6/1971 | Wiesboeck | 423/301 |
| 3,607,020 A | 9/1971 | Smith | 423/301 |
| 3,654,330 A | * 4/1972 | Wiesboeck | 423/301 |
| 3,769,387 A | * 10/1973 | Wiesboeck et al. | 423/301 |
| 3,907,977 A | 9/1975 | Wiesbock | 423/464 |
| 3,925,539 A | * 12/1975 | Meshri et al. | 423/474 |
| 4,265,865 A | 5/1981 | Muenster et al. | 423/300 |
| 4,880,714 A | 11/1989 | Bowden | 429/197 |
| 5,378,445 A | 1/1995 | Salmon et al. | 423/301 |
| 5,427,873 A | 6/1995 | Shuster | 429/188 |

FOREIGN PATENT DOCUMENTS

| DE | 812247 | * 8/1951 | 423/301 |
| DE | 29 28 599 | 1/1981 | |
| DE | 31 29 373 | 2/1983 | |
| EP | 643433 | 3/1995 | |
| EP | 662729 | 7/1995 | |

OTHER PUBLICATIONS

Translation of DE 812,247, Aug. 1951.*
Th. Kruck, "Trifluorophosphine Complexes of Transition Metals" Angew. Chem. Internat. Edit. / vol. 6 / No. 1, pp 53–67, 1967 (No month).*
Stacey et al, "Advances in Fluorine Chemistry", vol. 5 QD 198 F1 A3, pp 66–77, 1965 (No month).*
Brauer, Handbuch der Praeparativen Anorganischen Chemie (Handbook of Preparative Inorganic Chemistry), vol. 1, p. 215, Ferdinand Enke Verlag, Stuttgart (1975). (No month).
Abstract of Published Japanese Patent Application No. JP 60–251109 and Koyama et al., "Lithium hexafluorophosphate", Chemical Abstracts, No. 104:132424s. Dec. 1985.

* cited by examiner

*Primary Examiner*—Ngoc-Yen Nguyen
(74) *Attorney, Agent, or Firm*—Crowell & Moring LLP

(57) ABSTRACT

The preparation of phosphorus pentafluoride and arsenic pentafluoride by reacting corresponding trihalides with elemental chlorine, bromine or iodine and also with hydrogen fluoride.

4 Claims, No Drawings

METHOD OF PREPARING INORGANIC PENTAFLUORIDES

BACKGROUND OF THE INVENTION

The invention relates to the preparation of phosphorus and arsenic pentafluoride. Phosphorus pentafluoride can be reacted with lithium fluoride to form lithium hexafluorophosphate. Arsenic pentafluoride can also be used for the same purpose, and in the form of lithium hexafluoroarsenate can likewise be used as a conducting salt in lithium-ion batteries as disclosed in U.S. Pat. No. 5,427,874.

Phosphorus pentafluoride is prepared, for example, from phosphorus pentachloride and hydrogen fluoride. Arsenic pentafluoride is prepared from the metal and elemental fluorine. This method is disadvantageous in energy terms. Furthermore, elemental fluorine is very aggressive.

SUMMARY OF THE INVENTION

It is an aim of the present invention to provide a method for the preparation of pentafluorides of phosphorus and arsenic which is technically simple to perform.

This and other aims are achieved in accordance with the invention by providing a method of preparing an inorganic pentafluoride corresponding to the formula $MF_5$, where M represents P or As, comprising reacting a trihalide corresponding to the formula $MX_3$, where M has the meaning given above and X is fluorine, chlorine or bromine, with chlorine, bromine or iodine and with HF.

The preparation of $MF_5$ in accordance with the invention, wherein M represents P or As, is effected by the reaction of $MX_3$, wherein M has the meaning given above and X is fluorine, chlorine or bromine, with chlorine, bromine or iodine and with HF.

Preferably the method according to the invention is used for the preparation of phosphorus pentafluoride. The starting point preferably is phosphorus trichloride or phosphorus tribromide, or arsenic trichloride or arsenic tribromide, respectively. The respective starting compound is preferably reacted with chlorine or bromine, in particular chlorine, in order to oxidize the trivalent starting compound into the pentavalent state.

It has been found to be particularly advantageous if the method is performed continuously, although batchwise operation is, of course, possible. In the preferred, continuous procedure, it is possible to proceed in such a way that an excess of the trivalent starting compound is present in the reactor, relative to the oxidizing agent chlorine, bromine or iodine. Alternatively, an excess of the oxidizing agent can also be used. Good results are also achieved using stoichiometric equivalent amounts of the reactants. Hydrofluoric acid is advantageously used in at least the stoichiometrically required amount. HF may be used in an excess, and then also serves as a solvent. The reaction mixture may thereby comprise up to 70 wt.-% or more HF. Also, sufficient hydrogen fluoride should also constantly be present in the reactor, so that the product of the process (namely the pentafluoro compound) is evaporated off continuously in an amount corresponding to the addition of the starting compounds. For example, it is possible to proceed such that initially the trivalent starting compound and also sufficient hydrogen fluoride is provided and the oxidizing agent is introduced into this mixture. The reactants can then be introduced continuously into the reactor. By regulating the amount of the oxidizing agent or the trivalent compound which is added, it is possible to control the reaction rate. It is recommended to stir the reaction mixture.

Advantageously, the reaction is carried out at a temperature above −100° C. Particularly good results are obtained in the temperature range from −25° C. to 100° C., in particular in the temperature range from 0° C. to 40° C. It is thereby possible, if desired, to operate under elevated (i.e. superatmospheric) pressure, or alternatively at standard (atmospheric) pressure, e.g. in autoclaves at autogenous pressure.

Due to the great sensitivity of the compounds to hydrolysis, it is advantageous to operate under an inert gas, and/or with moisture excluded.

The advantage of the method according to the invention is that the reaction can be performed easily, since the starting compounds can be metered readily, and the reaction can be simply controlled by appropriate metering of the oxidizing agent or the trivalent starting compound. The method is particularly well-suited to the preparation of phosphorus pentafluoride from phosphorus trichloride, bromine or chlorine, and HF.

DETAILED DESCRIPTION OF PREFERRED EMBODIMENTS

The following examples are intended to illustrate the invention in further detail without restricting its scope.

EXAMPLES

Example 1

Preparation of $PF_5$ (Batch Process)

Reaction: 

| Composition: | |
| --- | --- |
| Formulation: 1/10 mole | |
| $PCl_3$ (137 g/mole) d = 1.57 g/cm³ | 10 ml (incl. 10% excess) |
| HF (20 g/mole) d = 1 g/cm³ | 10 ml |
| $Cl_2$ (35.5 g/mole) | 7 g |

Procedure $PCl_3$ and HF were placed a 250 ml autoclave, cooled to −43° C., and the chlorine was introduced in the liquid phase. During this, temperature increased to −39° C. Then autoclave set to "stir" and heated to room temperature. When the stirrer was started, the temperature momentarily rose to −1° C., but then cooled again. After one hour, the temperature reached room temperature (22° C.), and a pressure of 37 bar was attained. The mixture was left overnight with stirring. A mixture of $PF_5$ and HCl evaporated off. The $PF_5$ produced can be isolated by conventional separation methods, e.g. pressure distillation. The yield of $PF_5$, relative to the chlorine used, was >99%.

Example 2

Preparation of $PF_5$ (Batch Process)

Reaction: 

Composition:

Formulation: 1/10 mole

| | |
|---|---|
| $PCl_3$ (137 g/mole) d = 1.57 $g/cm_3$ | 10 ml (incl. 10% excess) |
| HF (20 g/mole) d = 1 $g/cm^3$ | 80 ml |
| $Br_2$ (160 g/mole) | 16 g |

Procedure

The autoclave, HF and $PCl_3$ were pre-cooled on dry ice. Then the HF and bromine were combined in the autoclave (bromine solidified immediately), and $PCl_3$ was added thereto. The autoclave was closed and heated to room temperature. The temperature thereby increased uniformly up to 10° C., then In so doing, regular temperature increase to 10° C., then jumped to 25° C. and the pressure increased to 18 bar. The $PF_5$ produced can be isolated by conventional separation methods, e.g. pressure distillation. If desired, the $PF_5$ can be processed further without isolation, for example with LiF to yield $LiPF_6$.

Example 3

Preparation of $AsF_5$ (Batch Process)

Reaction: 

Composition:

Formulation: 1/10 mole

| | |
|---|---|
| $AsCl_3$ (181.3 g/mole) d = 2.16 $g/cm^3$ | 25 ml |
| HF (20 g/mole) d = 1 $g/cm^3$ | 40 ml |
| $Cl_2$ (35.5 g/mole) | 21 g |

Procedure $AsCl_3$ and HF were placed in a 250 ml autoclave, cooled to −43° C., and the chlorine was introduced into the liquid phase. During this, temperature increased to −35° C. Then the autoclave was set to "stir" and heated to room temperature. The temperature reached room temperature (22° C.) after 4 hours, and a pressure of 21.5 bar was attained. The mixture was left overnight with stirring, and the next morning heated to 50° C. in 4 hours; the pressure rose to 27 bar. After cooling to room temperature, the pressure was again 21 bar. The $AsF_5$ produced can be isolated by conventional separation methods, e.g. pressure distillation. The $AsF_5$ can, if desired, also be processed further without isolation, for example with LiF to yield $LiAsF_6$.

Example 4

Preparation of $PF_5$ (Continuous Addition of $Cl_2$)

Starting materials:

| | |
|---|---|
| Phosphorus trichloride: | weight: 61.8 g = 0.45 mole |
| HF (high purity): | weight: 76.9 g = 3.84 mole, for reaction with the $PCl_3$; excess of 1.59 mole = 70.7% |
| Chlorine/$Cl_2$: | weight: 40.0 g = 0.56 mole |

Test Procedure

The vessels used were dried in a drying oven. The phosphorus trichloride was placed in the laboratory autoclave, and more than the equivalent required quantity of hydrogen fluoride (with $N_2$ cushion) was metered in slowly (the excess HF served as a solvent). The temperatures in the laboratory autoclave during the subsequent continuous metered introduction of chlorine in the open system (duration: 355 minutes) were between −65.7° C. and −21.7° C. During the metered introduction of the chlorine, a gas mixture of $PF_5$ and HCl was produced, which was removed from the autoclave. The mixture can be separated by conventional separation methods, e.g. pressure distillation.

Example 5

Preparation of $PF_5$ from $PCl_3$ and $Cl_2$

Starting materials:

| | |
|---|---|
| Phosphorus trichloride: | weight: 45.9 g = 0.33 mole |
| HF: | weight: 106.8 g = 5.34 mole |
| $Cl_2$: | weight: 23.9 g = 0.34 mole |

Procedure

The $PCl_3$ was metered into the autoclave, which was then closed. Once the autoclave had been cooled to −57.6° C., the hydrogen fluoride was metered in and the mixture re-cooled, to −59.3° C. Then the chlorine was added. The cooling was then withdrawn, and a pressure buildup to 43 bar occurred at 25.1° C.

The resulting gas mixture of $PF_5$ and HCl was released from the autoclave and could be introduced without further treatment into a reactor with LiF, in which $LiPF_6$ then formed. No $PF_3$ could be detected in the gas mixture.

Example 6

Preparation of $PF_5$ by Reaction of Equimolar Quantities of $PCl_3$ and $Cl_2$ Example 5 was repeated with 45.3 g=0.33 mole $PCl_3$, 23.5 g=0.33 mole $Cl_2$ and 111.2 g=5.56 mole HF. The resulting $PF_5$/HCl gas mixture again could be reacted with LiF without further treatment to produce $LiPF_6$. No $PF_3$ could be detected in the gas mixture.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of preparing an inorganic pentafluoride corresponding to the formula $MF_5$, where M represents P or As, said method comprising:

reacting a trihalide corresponding to the formula $MX_3$, where M has the meaning given above and X is chlorine or bromine, with chlorine, bromine or iodine and with an excess of HF at elevated pressure and a temperature between −25° C. and 100° C. in a pressure vessel, whereby a mixture of $MF_5$ and HX is formed; and releasing and discharging the mixture from the pressure vessel as a gaseous mixture and isolating the $MF_5$ formed.

2. A method according to claim 1, wherein $PCl_3$ or $PBr_3$ is reacted with chlorine or bromine and with HF.

3. A method according to claim 1, wherein a stoichiometric excess of HF is present and acts as a solvent.

4. A method according to claim 1, wherein said temperature is between 0° C. and 40° C.

* * * * *